June 17, 1958  J. T. McCOLLOM  2,839,663
WELDING APPARATUS
Filed March 6, 1957  4 Sheets-Sheet 1
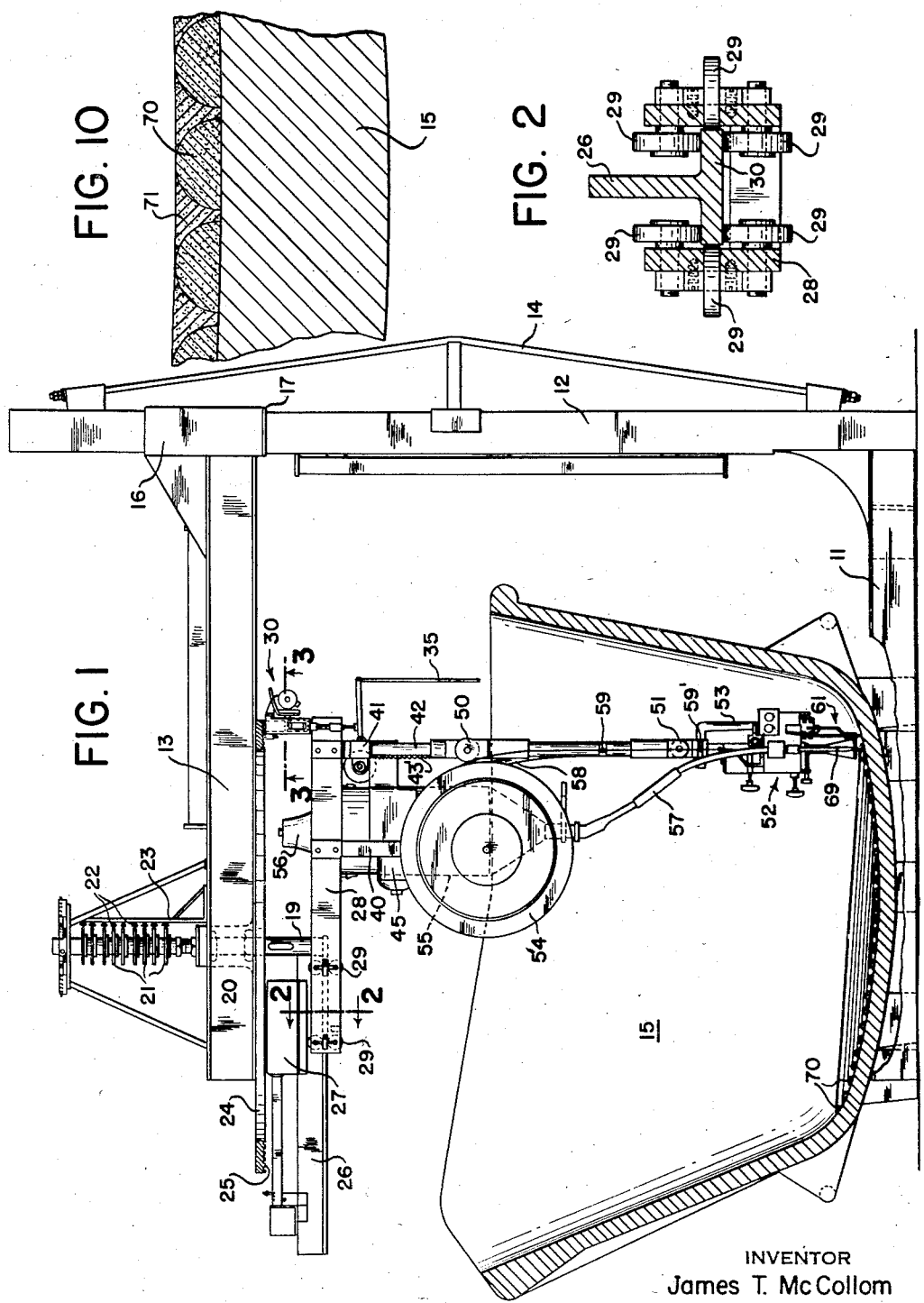
INVENTOR
James T. McCollom
BY
ATTORNEYS June 17, 1958   J. T. McCOLLOM   2,839,663
WELDING APPARATUS Filed March 6, 1957   4 Sheets-Sheet 2

INVENTOR
James T. McCollom
BY
*Pennie, Edmonds, Morton, Barrows & Taylor*
ATTORNEYS

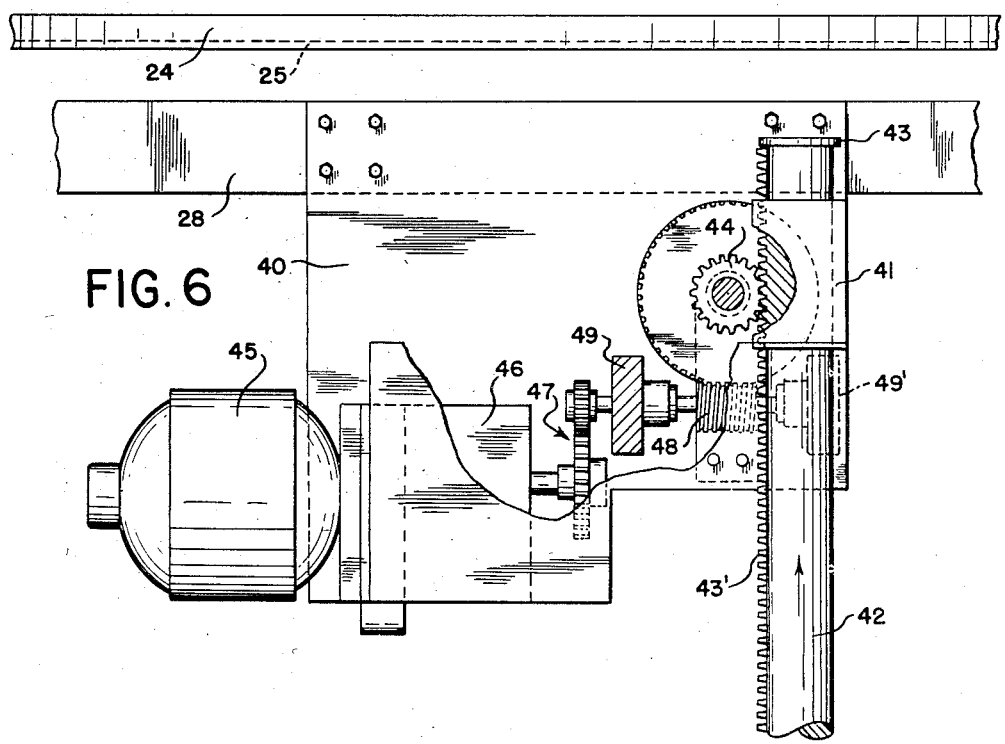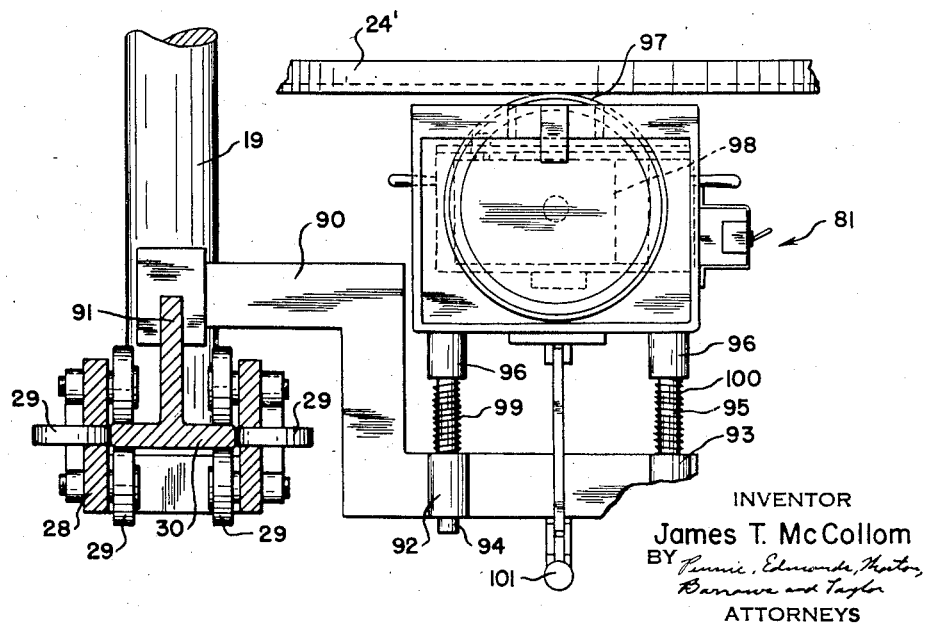

June 17, 1958  J. T. McCOLLOM  2,839,663
WELDING APPARATUS
Filed March 6, 1957  4 Sheets-Sheet 4
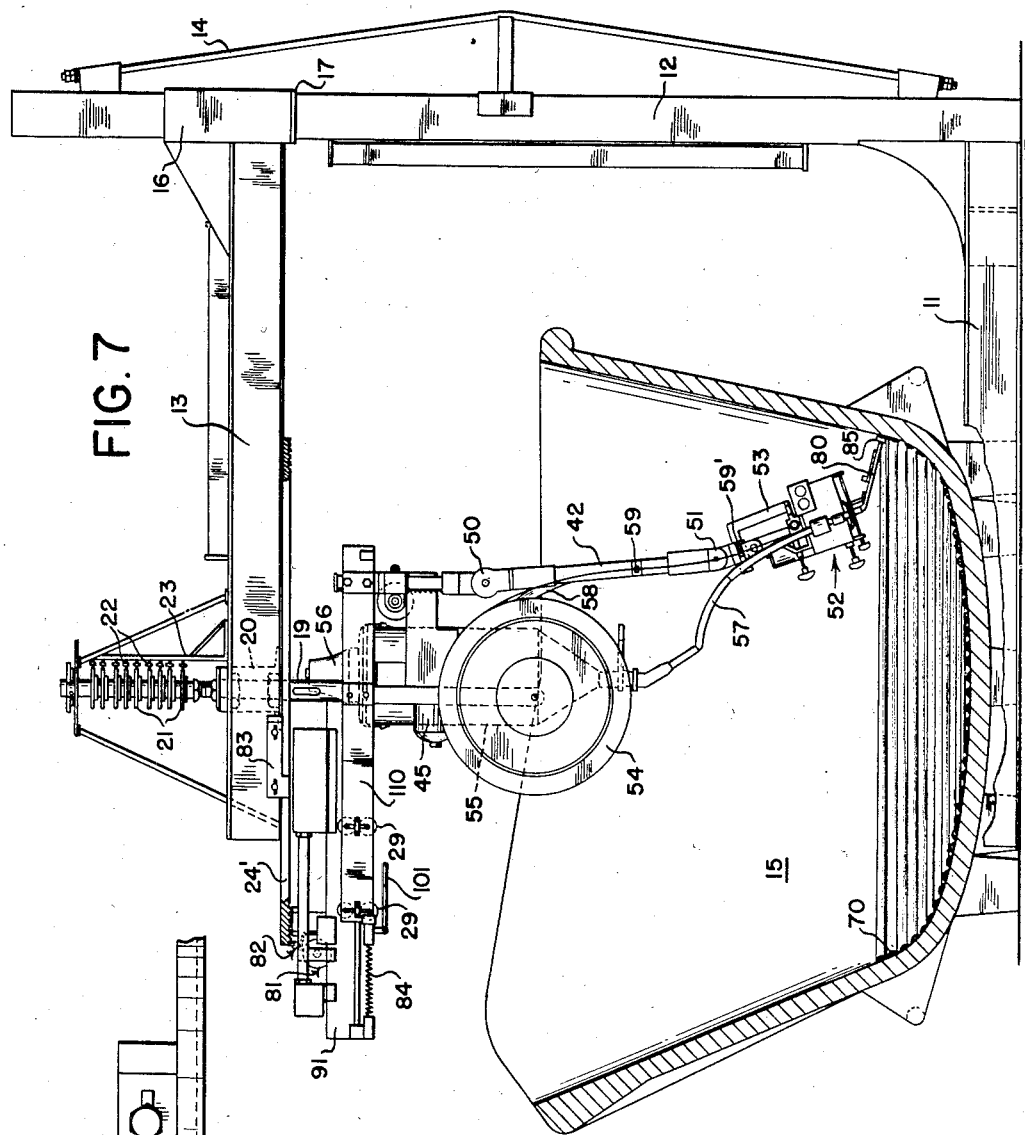
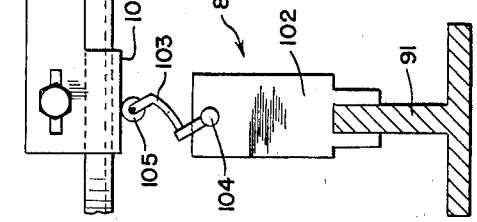
INVENTOR
James T. McCollom
BY
ATTORNEYS

United States Patent Office 2,839,663
Patented June 17, 1958

2,839,663

WELDING APPARATUS

James T. McCollom, Anaconda, Mont., assignor to The Anaconda Company, a corporation of Montana Application March 6, 1957, Serial No. 644,333

8 Claims. (Cl. 219—76)

This invention relates to welding apparatus for depositing a refractory metal lining on the interior surface of molten metal ladles and, more particularly, to apparatus adapted to advance arc welding apparatus along a path of travel designed to apply a surface layer of refractory metal on the inside of the ladle. The welding apparatus according to this invention is mounted on a supporting arm which is adapted to move vertically on a carriage, and the carriage is longitudinally movable along a horizontal beam which is adapted to rotate beneath a plate.

The inside surface of ladles used for handling molten metal suffer extremely severe wear from the eroding effects of the impinging hot metal unless they are protected by a refractory metal lining. Hence, the practice has arisen to periodically deposit a refractory alloy such as a stainless steel by conventional welding methods over at least the bottom inside surface of the ladle and, in some cases, over virtually the entire inside surface. Heretofore this procedure has required that a welder with his equipment climb into the ladle and meticulously lay a large area of welding bead under extremely unpleasant working conditions. The process is slow and tedious and, for the larger ladles, takes weeks to complete.

Because of the great size and irregular shape of such ladles, no known automatic welding machines could be adapted to replace the conventional manual method. The present apparatus was therefore designed specifically for the purpose, and permits a large ladle to be completely lined in a few hours with a minimum of attention by a non-specialized operator. After a quite simple set-up the machine may be left unattended to automatically line the entire bottom surface of the ladle, and, after a few minor alterations, only periodic attention is required as it proceeds automatically to the ladle rim. Not only can a relatively unskilled person attend to the operation, but it is no longer required that he work at length within the confines of the ladle. Furthermore, the ladle can be returned to service more quickly with a much more uniform lining.

In the apparatus contemplated by this invention, a fixed horizontal plate is positioned to overlie the ladle being lined. Mounted substantially parallel to and closely adjacent this plate is a beam which is rotatable in a plane parallel to the plate about an axis normal to and disposed centrally of the plate. A driving wheel is mounted on the beam and engages the plate for rotating the beam. Arc welding apparatus is suspended from a carriage which is mounted for movement along the beam, and the welding apparatus extends into welding position with respect to the inside surface of the ladle.

In one arrangement of this apparatus, adapted specifically for lining the bottom inside surface of the ladle, a follower pin is secured to the carriage and engages in a spiral groove formed in one face of the plate for moving the carriage along the beam. In another arrangement of this apparatus, which is particularly adapted for lining the side walls of the ladle, the carriage is urged toward one end of the beam by spring means.

The invention also contemplates a method of depositing a protective metal layer on a metallic surface, wherein a welding bead is first laid in a spiral path extending outwardly from the center to the periphery of the surface and having a constant lead substantially equal to the width of the bead. A second welding bead is then laid outwardly from the center to the periphery of the surface in a similar spiral path defined between the turns of the first spiral path. By this method the second bead is deposited between the turns of the first bead to form a continuous substantially flat circular lining.

Following is a detailed description of a preferred embodiment of each of the aforementioned arrangements of the new apparatus, presented in conjunction with the accompanying drawings, in which—

Fig. 1 is an elevation partly in section of an arrangement of the apparatus adapted for lining the bottom of the ladle;

Fig. 2 is a section taken along the line 2—2 of Fig. 1, showing the construction of the carriage and the beam;

Fig. 6 is an elevation partly in section of the supporting arm driving means for varying the elevation of the lower end of the supporting arm upon which the welding apparatus is mounted;

Fig. 7 is an elevation partly in section of an arrangement of the apparatus adapted for lining the side wall of the ladle;

Fig. 8 is an elevation of the means responsive to the rotation of the beam for actuating the supporting arm driving means;

Fig. 9 is an end elevation partly in section of the driving means for rotating the beam of the apparatus of Fig. 8; and Fig. 10 is an enlarged sectional view of the lining deposited by the embodiment of the apparatus illustrated in Fig. 1.

Figure 3:
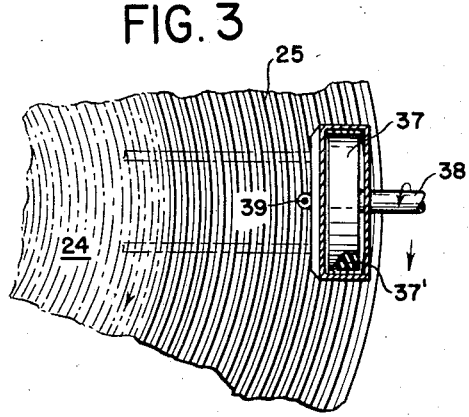
Fig. 3 is a view taken along the line 3—3 of Fig. 1 of the spiral groove on the underside of the plate, showing the follower pin engaged in the spiral groove and the wheel of the driving means which rotates the beam.

Referring first to Fig. 1, the apparatus is supported by a jib structure consisting of a base 11, a vertical cylindrical post 12 and a horizontal boom 13. The post 12 is affixed to the base 11, and is given added rigidity by a tension rod 14. In order to permit the boom 13 to be swung aside when a ladle 15 is being positioned on the base 11, the boom extends perpendicularly from a collar 16 which is coaxially supported about the cylindrical post 12 on a shoulder 17.

At the outer end of the boom 13, a vertical shaft 19 is rotatably mounted in thrust bearings 20. On the upper end of the shaft 19 above the boom are a number of slip rings 21 engaging corresponding brushes 22 which are mounted on a frame 23. All electrical circuits for the arc welding unit and the motors associated with the apparatus are connected to a source of electrical power through these rings and brushes. The lower end of the shaft 19 extends through a horizontal circular scroll plate 24 which is secured to the underside of the boom 13 coaxial with the shaft. As can best be seen in Fig. 3, a spiral groove 25 is formed on the lower face of the plate 24. This groove progresses outwardly from the center to the periphery of the plate in a spiral path having a constant lead substantially equal to the width of the welding bead deposited in the ladle by the welding apparatus.

Returning to Fig. 1, a beam 26 is perpendicularly mounted on the lower end of the shaft 19 and carries an electrical distribution panel box 27. When the ladle 15 is operationally positioned on the base 11, substantially coaxial with the shaft 19, the beam 26 sweeps over virtually the entire ladle as it is rotated. A carriage 28 is adapted to move along the beam 26 on rollers 29 which are illustrated most clearly in Fig. 2. The cross-secion of the beam 26 is in the shape of an inverted T such that the lower flange 30 provides upper, lower, and lateral carriage ways upon which the rollers 29 travel, thus permitting the carriage 28 to move longitudinally relative to the beam 26.

Figure 4:
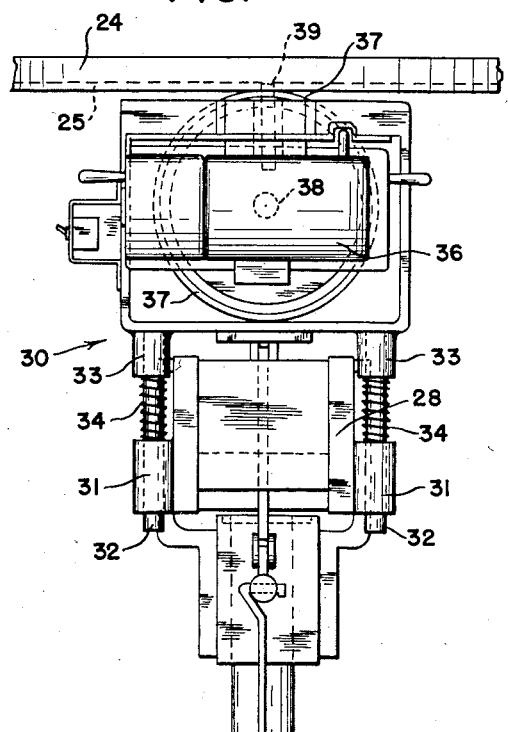
Fig. 4 is an end elevation of the carriage showing the plate, follower pin, and driving means for rotating the beam.

Fig. 4 shows in detail a driving means 30 which is removablly mounted on the end of the carriage 28. Vertical sleeves 31 are secured to either side of the carriage to receive corresponding pins 32 which extend downwardly from the driving means frame 33. A helical compression spring 34 is positioned concentrically about each pin between the frame 33 and each sleeve 31. By pulling downwardly on a handle 35 attached to the frame 33, the springs 34 may be depressed and the frame moved downwardly.

Located on the frame 33 is an electric motor 36 which turns a wheel 37 through a shaft 38. The wheel is normally forced upwardly by the springs 34 into engagement with the underside of the scroll plate 24 and extends across approximately three turns of the spiral groove 25 on the scroll plate as seen in Fig. 3. A rubber facing 37' covers the running surface of the wheel 37 to prevent slipping on the underside of the plate 24 as the wheel travels in its substantially tangential path with respect to the spiral groove.

Also located on the driving means frame 33 is a vertical follower pin 39 which normally engages in the spiral groove 25. It will be seen that by energizing the motor 36, the carriage 28 and the beam 26 upon which it is mounted are rotated about the shaft 19 immediately under the scroll plate 24. With the follower pin 39 engaged in the spiral groove 25, the carriage 28 will then move either inwardly or outwardly along the beam 26 depending upon the direction of rotation by the wheel 37, and the end of the carriage will describe a spiral path similar to that of the spiral groove in the scroll plate. The wheel 37 and the follower pin 39 may be conveniently disengaged from the scroll plate by pulling downwardly on the handle 35, if it is desired to move the carriage to a different position beneath the plate.

Referring now to Figs. 1 and 6, a frame 40 is securely bolted to the outer end portion of the carriage 28 and extends downwardly beneath the carriage. It carries a vertically disposed sleeve 41 at its outer edge. The sleeve 41 is positioned so as not to be in line with the carriage 28 above. A supporting arm 42 has an upper end portion of cylindrical cross-section which is adapted to slide vertically within the sleeve 41, and a shoulder 43 on the upper extremity of the supporting arm which prevents the arm from slipping downwardly through the sleeve 41. Thus it can be seen that the upper and lower limits imposed on the vertical movement of the supporting arm 42 are the underside of the scroll plate 24 and the upper face of the sleeve 41 respectively. For purposes of illustration the distance between these limits has not been shown in its proper proportions in Fig. 6; a more accurate indication is given by Fig. 1.

The supporting arm 42 may be moved vertically within the sleeve 41 by the supporting arm driving means shown in Fig. 6. A rack of gear teeth 43' longitudinally disposed on the upper end portion of the supporting arm, passes through a corresponding longitudinal slot in the sleeve 41 when the arm is moved vertically. A pinion 44 meshes with the rack 43' and is driven by an electric motor 45 through a gear box 46, spur gears 47, and a worm gear 48. The worm gear is mounted between bearings 49 and 49' secured to the frame 40.

The supporting arm 42 is hinged in two places by knuckles 50 and 51 (Fig. 1), both permitting angular adjustment of the arm in the plane formed by the arm and the carriage. Welding apparatus 52 is removably attached to the lower extremity of the supporting arm by a bent pin 53 which permits further angular adjustment in the vertical plane of the arm perpendicular to the aforementioned plane. Each of these angular adjustment means have conventional locking devices associated therewith enabling the welding apparatus to be supported rigidly beneath the carriage. Inasmuch as the welding apparatus 52 is a conventional electric arc unit, there is no need to describe its construction in detail.

Further conventional welding equipment mounted on the frame 40 includes a reel 54 of welding wire, a flux hopper 55, and a suction fan 56. A length of flexible tubing 57 and a suction hose 58 lead downwardly from the hopper and the suction fan respectively to the welding apparatus. Eyelets 59 and 59' are positioned to guide the welding wire between the reel 54 and the welding apparatus 52.

Figure 5:
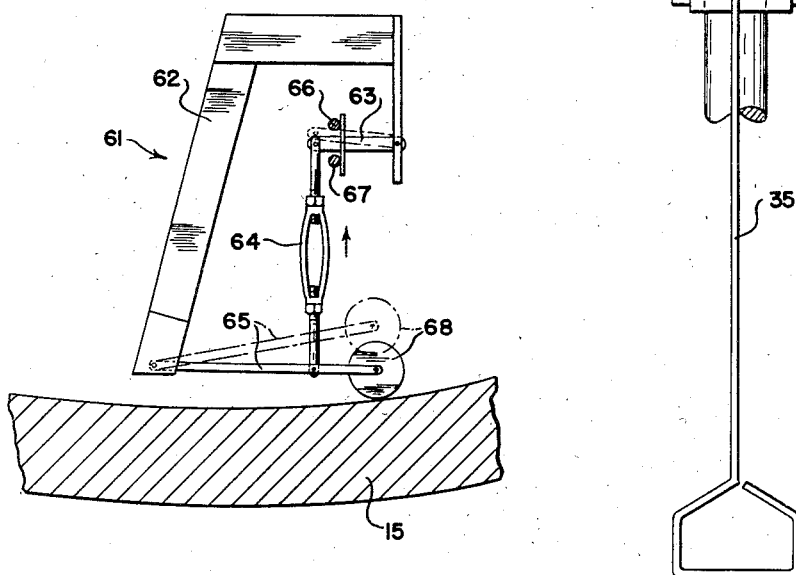
Fig. 5 is an elevation of the feeler means responsive to variations in the contour of the surface being lined to actuate the supporting arm driving means.

Fig. 5 shows in detail the feeler means 61 for actuating the supporting arm driving means of Fig. 1. Pivotally attached between two ends of a frame 62 secured to the welding apparatus 52, is a linkage consisting of a switch arm 63, and adjustable link 64, and a roller bar 65. The switch arm 63, along with upper and lower switch contacts 66 and 67 respectively, comprises a three-position switch. When the switch arm 63 is in contact with the upper contact 66, a circuit is closed which energizes the motor 45 causing the supporting arm 42 to move upwardly. Conversely, when the switch bar contacts the lower contact 67 the supporting arm is moved downwardly. With the switch arm in a neutral position between the contacts, the motor 45 is not energized and the supporting arm remains at constant elevation.

A roller 68 is mounted on the free end of the roller bar 65 to be immediately adjacent the tip of a straight welding wire guide 69. If a variation in the contour of the surface being lined is encountered by the roller, it will ride either downwardly and carry the switch arm 63 into contact with the lower contact 67 thus causing the tip of the welding wire guide 69 to descend, or it will ride upwardly and close the switch arm on the upper contact 66 thus causing the tip to ascend. The welding apparatus will therefore remain in continuous operative contact with the surface to be lined regardless of incidental variations in the contour of the surface. The turnbuckle on the adjustable link 64 permits the neutral position of the switch arm 63 to be varied.

In the operation of the apparatus of Fig. 1 for lining the bottom surface of the ladle, the ladle 15 is initially positioned on the base 11 substantially coaxial with the scroll plate 24, and the knuckles 50 and 51 and the bent pin 53 are each adjusted so as to direct the supporting arm straight down into the ladle as shown. The handle 35 is pulled downwardly to disengage the driving means 30 from the plate and the carriage 28 is rolled to the left along the beam 26 as far as possible. In this position the supporting arm 42 will be coaxial with the shaft 19 and the tip of the welding wire guide 69 will be at the center of the bottom surface of the ladle 15. After re-engaging the driving means 30 with the scroll plate 24, power is supplied to the welding apparatus and an arc is struck in the conventional manner. Power is then supplied to all other circuits of the apparatus and the driving means 30 commences to rotate the beam around the underside of the plate 24.

Because of the previously described characteristics of the spiral groove 25, in which the follower pin 39 is engaged, the welding apparatus 52 deposits a first bead 70 spiralling outwardly from the center of the ladle. Any irregularities in surface contour encountered by the welding apparatus will be sensed by the feeler means 61 as described, and the elevation of the welding apparatus will be adjusted accordingly. Upon reaching the periphery of the bottom of the ladle the apparatus is halted, the driving means 30 is disengaged, and the carriage 28 is returned to center position. A second spiral bead 71 is then deposited in the same manner between the turns of the first bead 70, as illustrated in cross-section in Fig. 11. In order to obtain a flat resultant lining the turns of the first bead 70 must be spaced slightly apart to permit the second bead 71 to fill the groove defined by the first bead evenly up to the level of the first bead.

Referring now to Fig. 7, an arrangement of the apparatus is there illustrated which is adapted to line the side walls of the ladle. To convert the previously discussed appartus to this arrangement requires essentially only four alterations. Firstly, the straight welding wire guide is replaced with a curved welding wire guide 80; secondly, the driving means (with the follower pin removed) is relocated as driving means 81 on the outer end of the beam; thirdly, the feeler means on the welding apparatus is removed to be substituted by the actuation means 82 and the trip plate 83 on the beam and scroll plate respectively; and fourthly, a compression spring 84 is provided to urge the carriage along the beam.

It will be seen, therefore, that the majority of the elements of the apparatus of Fig. 7 remain the same in character, location, and function as in the apparatus of Fig. 1. Such elements have the same reference number in both Fig. 7 and Fig. 1.

The curved welding wire guide 80 is directed outwardly with respect to the center of the ladle and has a small wheel 85 attached thereto in rolling engagement with the surface of the ladle wall.

Fig. 9 illustrates the driving means 81 in detail. A bracket 90, serving as a mount for the driving means 81, is secured at one end of the upper edge of the outer end of a beam 91 which extends horizontally from the lower end of the shaft 19. Sleeves 92 and 93 at the opposite end of the bracket 90 cooperate respectively with pins 94 and 95. Mounted upon the pins 94 and 95 is a frame 96 which supports a rubber tired driving wheel 97 driven by a motor 98, as in the previously discussed arrangement. Springs 99 and 100 are interposed between the sleeves 92 and 93 and the frame 96 around the pins 94 and 95 respectively, and a handle 101 extends downwardly from the frame 96.

The driving wheel 97 engages the underside of a scroll plate 24' (identical to the scroll plate of the previous arrangement) at the periphery of the plate. When the motor 98 is energized, the wheel 97 travels about the plate 24' thereby rotating the beam 91. To disengage the wheel 97 and stop the rotation of the beam, the handle 101 is pulled manually downwardly which depresses the springs 99 and 100 and lowers the frame 96. It is to be noted that the follower pin 39 of the apparatus of Fig. 1 is removed from the apparatus in the embodiment of Fig. 7 and the spiral groove in the scroll plate is not utilized.

Actuation of the supporting arm driving means of Fig. 6 (which is identical in both arrangements of the apparatus) is effected by the actuation means illustrated in Fig. 8, and the feeler means employed in the previously described arrangement is removed. A conventional on-off electric switch 102 is secured to the outer end of the beam 91 on the upper edge thereof, with a switch arm 103 pivotally attached by a pin 104. Rotatably mounted on the upper end of the arm 103 is a roller 105 positioned to travel around and immediately beyond the periphery of the travel plate 24'. However, the trip plate 83 is secured to the circumference of the plate and projects a cam surface 106 into the path of travel of the roller 105. Thus when the roller 105 encounters and rides up on the cam surface 106, the switch arm 103 is pivoted and a circuit is closed in the switch 102.

Closure of this circuit energizes the motor 45 of the supporting arm driving means in a direction resulting in upward movement of the supporting arm 42. The length of the cam surface 106 is such that the curved welding wire guide 80 is raised a distance substantially equal to the width of the welding bead deposited on the side wall of the ladle.

The supporting arm 42 depends from a carriage 110 which is movable along the beam 91 on rollers in the manner described in reference to Fig. 2. The helical compression spring 84 is interposed between abutments on the beam 91 and the carriage 110, thereby exerting a constant outward force on the carriage which is resisted by the force exerted by the side wall of the ladle 15 on the wheel 85 attached to the curved welding wire guide 80. As a result, the welding apparatus on the supporting arm is continually urged against the surface to be lined.

To proceed with the lining operation up the interior side walls of the ladle, the welding wire guide 80 is directed to the base of the wall surface adjoining the previously lined bottom surface. The circumferential starting position within the ladle is determined by locating the roller 105 immediately off and to the right of the cam surface 106 as viewed in Fig. 8. Under the force of the spring 84, the wheel 85 is urged against the surface of the ladle and the arc is struck in the conventional manner. All circuits are then closed and the suspension assembly is driven about the underside of the plate 24' by the driving means 81. Any radially inward deviation from a circle of the contour of the wall surface will cause an inward force to be exerted on the wheel 85 by the surface itself, and any outward deviation will cause an outward force to be exerted on the wheel 85 by the compression spring 84. As a result the welding wire guide 80 will remain in continuous operative contact with the surface as the bead is deposited.

When the roller 105 returns to the cam surface 106, the switch arm 103 is deflected, the motor 45 is energized, and the welding apparatus is raised by the supporting arm the width of approximately one bead. As this continues and successive beads are deposited up the wall of the ladle, the upper extremity of the supporting arm 42 approaches its upper limit of travel, namely the underside of the scroll plate 24'. Furthermore, because the walls of the ladle flare outwardly, the spring correspondingly advances the carriage 110 outwardly on the beam 91 and will eventually reach its minimum effective bias. Therefore, the apparatus is halted periodically (after perhaps every ten or twelve beads) to lower the supporting arm 42, reposition the carriage 110 and relocate the welding apparatus in operative contact with the ladle wall by adjusting the knuckles 50 and 51. With this periodic adjustment the lining operation may be continued practically to the rim of the ladle. It is also advantageous using this arrangement of the apparatus to deposit a second succession of beads in the grooves defined between the first in order to obtain a uniformly flat surface, as discussed in reference to Fig. 10.

While the apparatus of this invention has been described in its application to large molten metal lades, it is obvious that its versatility renders it applicable to many other metallic surfaces. If a layer of metal is to be deposited on a convex rather than a concave surface, the first arrangement can be used without alteration and the second arrangement requires only one minor adjustment— the motor 45 is to be electrically reconnected so as to drive the supporting arm downwardly, rather than upwardly, when periodically energized by the switch 102. It is also clear that a perfectly flat surface can also be lined by the first arrangement of this invention as readily as a substantially flat surface.

I claim:

1. Apparatus for depositing a refractory metal lining on the interior surface of a ladle for molten metal comprising a fixed horizontal plate positioned to overlie said ladle, a beam mounted substantially parallel to and closely adjacent said plate, said beam being rotatable in a plane parallel to said plate about an axis normal to and disposed centrally of said plate, a driving wheel mounted on said beam and engaging said plate for rotating said beam, a carriage mounted for movement along said beam, and arc welding apparatus suspended from said carriage and adapted to extend into welding position with respect to the inside surface of said ladle.

2. Apparatus for depositing a refractory metal lining on the interior surface of a ladle for molten metal comprising a fixed horizontal plate positioned to overlie said ladle, a beam mounted closely beneath and substantially parallel to said plate, said beam being rotatable in a plane parallel to said plate about an axis normal to said plate and disposed substantially centrally with respect both to said plate and said ladle, a driving wheel mounted on said beam and engaging the underside of said plate for rotating said beam, carriage ways on said beam, a carriage supported by said beam and movable along said ways, and arc welding apparatus suspended from said carriage and adapted to extend into welding position with respect to the inside surface of said ladle.

3. Apparatus for depositing a refractory metal lining on the interior surface of a ladle for molten metal comprising a fixed horizontal plate positioned to overlie said ladle, said plate being formed with a spiral groove in one face thereof, a beam mounted substantially parallel to and closely adjacent the grooved surface of said plate, said beam being rotatable in a plane parallel to said plate about an axis normal to and disposed centrally of said plate, a follower pin secured to the carriage and engaging in the spiral groove of said plate, a driving wheel mounted on said beam and engaging said plate for rotating the beam, a carriage mounted for movement along said beam, and arc welding apparatus suspended from said carriage and adapted to extend into welding position with respect to the inside surface of said ladle.

4. Apparatus for depositing a refractory metal lining on the interior surface of a ladle for molten metal comprising a fixed horizontal plate positioned to overlie said ladle, said plate being formed with a spiral groove in the lower face thereof, a beam rotatably mounted closely beneath and substantially parallel to said plate, said beam being rotatable in a plane parallel to said plate about an axis normal to said plate and disposed substantially centrally with respect both to said plate and said ladle, a follower pin secured to the carriage and engaging in the spiral groove of said plate, a driving wheel mounted on said beam and engaging the lower face of said plate for rotating said beam, carriage ways on said beam, a carriage supported by said beam and movable along said ways, and arc welding apparatus suspended from said carriage and adapted to extend into welding position with respect to the interior surface of said ladle.

5. Apparatus for depositing a refractory metal lining on the interior surface of a ladle for molten metal comprising a fixed horizontal plate positioned to overlie said ladle, said plate being formed with a spiral groove in the lower face thereof, a beam rotatably mounted closely beneath and substantially parallel to said plate, said beam being positioned for rotation substantially about the axis of said ladle, a follower pin secured to the carriage and engaging in the spiral groove of said plate, driving means engaging the underside of said plate for rotating said carriage and beam, carriage ways on said beam, a carriage supported by said beam and movable along said ways, a supporting arm depending from said carriage into said ladle, welding apparatus mounted on the lower end of said supporting arm in welding position with respect to the inside surface of said ladle, and means for varying the elevation of the lower end of said supporting arm upon which said welding apparatus is mounted.

6. Apparatus for depositing a refractory metal lining on the interior surface of a ladle for molten metal comprising a fixed horizontal plate positioned to overlie said ladle, said plate being formed with a spiral groove in the lower surface thereof, a beam mounted closely beneath and substantially parallel to said plate, said beam being mounted for rotation substantially about an axis normal to said plate and disposed substantially centrally with respect to said ladle, carriage ways on said beam, a carriage supported by said beam and movable along said ways, driving means mounted on said carriage engaging the underside of said plate for rotating said beam, a follower pin secured to the carriage and engaging in the spiral groove of said plate for moving said carriage along said ways as the beam rotates, a supporting arm depending from said carriage into said ladle, welding apparatus mounted on the lower end of said supporting arm in welding position with respect to the inside surface of said ladle, supporting arm driving means for varying the elevation of the lower end of said supporting arm upon which said welding apparatus is mounted, and means responsive to variations in the contour of the ladle surface for actuating said supporting arm driving means.

7. Apparatus for depositing a refractory metal lining on the interior surface of a ladle for molten metal comprising a fixed horizontal plate positioned to overlie said ladle, a beam mounted closely beneath and substantially parallel to said plate, said beam being rotatable in a plane parallel to said plate about an axis normal to said plate and disposed substantially centrally with respect both to said plate and said ladle, a driving wheel mounted on said beam and engaging the underside of said plate for rotating said beam, carriage ways on said beam, a carriage supported by said beam and movable along said ways, spring means urging said carriage along said ways toward one end of said beam, and arc welding apparatus suspended from said carriage and adapted to extend into welding position with respect to the inside surface of said ladle.

8. Apparatus for depositing a refractory metal lining on the interior surface of a ladle for molten metal comprising a fixed horizontal plate positioned to overlie said ladle, a beam mounted closely beneath and substantially parallel to said plate, said beam being mounted for rotation substantially about an axis normal to said plate and disposed substantially centrally with respect to said ladle, carriage ways on said beam, a carriage supported by said beam and movable along said ways, driving means mounted on said carriage and engaging the underside of said plate for rotating said beam, a supporting arm depending from said carriage into said ladle, welding apparatus mounted on the lower end of said supporting arm in welding position with respect to the inside surface of said ladle, supporting arm driving means for varying the elevation of the lower end of said supporting arm upon which said welding apparatus is mounted, and means responsive to rotation of the beam for indexing said supporting arm driving means.

References Cited in the file of this patent

UNITED STATES PATENTS

| | | |
|---|---|---|
| 1,957,489 | Comstock | May 8, 1934 |
| 1,983,321 | Stephens et al. | Dec. 4, 1934 |
| 2,191,469 | Hopkins | Feb. 27, 1940 |
| 2,379,531 | Lippart | July 3, 1945 |
| 2,427,350 | Carpenter et al. | Sept. 16, 1947 |
| 2,522,146 | Tichenor et al. | Sept. 12, 1950 |
| 2,592,414 | Gibson | Apr. 8, 1952 |